UNITED STATES PATENT OFFICE.

HERBERT WINKEL, OF WILMINGTON, DELAWARE, ASSIGNOR TO E. I. DU PONT DE NEMOURS & COMPANY, OF WILMINGTON, DELAWARE, A CORPORATION OF DELAWARE.

PROCESS OF PRODUCING DIALKYLDIARYLUREAS.

1,307,570.　　　　　Specification of Letters Patent.　　Patented June 24, 1919.

No Drawing.　　　Application filed September 25, 1918.　Serial No. 255,598.

*To all whom it may concern:*

Be it known that I, HERBERT WINKEL, of Wilmington, in the county of New Castle, and in the State of Delaware, have invented a certain new and useful Improvement in Processes of Producing Dialkyldiarylureas, and do hereby declare that the following is a full, clear, and exact description thereof.

This invention relates to a process of producing dialkyldiarylureas by the action of carbonyl chlorid on alkylarylamins, and pertains especially to a process of this kind in which a tertiary amin is used to combine with the hydrogen chlorid formed during the reaction.

It has been proposed to produce a dialkyldiarylurea, such as dimethyldiphenylurea, by passing carbonyl chlorid into a benzene solution of a mixture of monomethylanilin and dimethylanilin. In such a process it is necessary, after the completion of the reaction, to distil off the benzene, an operation which consumes time and involves a loss of more or less benzene. One object of my invention is to provide a process in which a solvent, such as benzene, may be dispensed with and in this way lessen the expense of the process.

I have found that it is possible by a proper adjustment of the temperature to dispense with the use of this solvent, and to prepare dimethyldiphenylurea by passing carbonyl chlorid directly into a mixture of monomethylanilin and dimethylanilin (which may or may not contain in addition small quantities of anilin). This is accomplished by keeping the reaction mixture at a temperature of about 80-90° C. so that the materials are maintained in a liquid condition and the introduction of the carbonyl chlorid may be continued until the reaction is complete. The explanation of this procedure is that at the temperature mentioned the mixture of dimethyldiphenylurea and dimethylanilin hydrochlorid formed by the reaction is liquid, so that in effect the dimethylanilin hydrochlorid acts as a solvent for the monomethylanilin until at the end of the reaction practically all of this secondary amin is converted into dimethyldiphenylurea.

The temperature of 80-90° C. mentioned is not necessarily maintained throughout the course of the reaction. As a matter of fact it is more advantageous to start out at a lower temperature, and to raise the temperature gradually to such points as may be necessary in order to keep the reaction mixture in a liquid condition. This temperature rarely exceeds 100° C. but depends upon the composition of the mixture which may be used in each particular run.

Although the conditions under which the process is operated may be varied within certain limits and the mixture of amins used may be of various compositions, the following is given as an example of the manner in which the process may be carried out:

Carbonyl chlorid in the form of a gas is passed into a mixture of anilin, monomethylanilin, and dimethylanilin in the proportions of 10%, 40% and 50%, respectively. As the reaction proceeds the mixture becomes viscous, and the temperature is gradually raised in order to keep the mixture in a liquid condition, and thus to promote the reaction between the carbonyl chlorid and the monomethylanilin. With a mixture of the above composition the final temperature need not exceed 100° C., but should be as high as 80° C. In all cases, however, the temperature must be regulated in accordance with the condition of the reaction mixture. When the monomethylanilin has all been converted into dimethyldiphenylurea, absorption of carbonyl chlorid ceases and the reaction is considered complete. The reaction mixture is then treated with dilute hydrochloric acid for the complete removal of the dimethylanilin, etc. The dimethyldiphenylurea is insoluble in the dilute acid, and may therefore be filtered off and washed free from acid with water. In order to complete the purification the crude product may be crystallized from a suitable solvent.

I claim:—

1. The process of producing dialkyldiarylureas which comprises treating with carbonyl chlorid a mixture composed essentially of an alkylarylamin and a dialkylarylamin, while heating the mixture sufficiently to maintain the same in a liquid condition.

2. The process of producing dialkyldiarylureas which comprises treating with carbonyl chlorid a mixture composed essentially of substantially equal molecular proportions of an alkylarylamin and a dialkylarylamin, while heating the mixture sufficiently to maintain the same in a liquid condition.

3. The process of producing dialkyldiarylureas which comprises treating with carbonyl chlorid a mixture composed essentially of methylanilin and dimethylanilin, while heating the mixture sufficiently to maintain the same in a liquid condition.

4. The process of producing dialkyldiarylureas which comprises treating with carbonyl chlorid a mixture composed essentially of substantially equal molecular proportions of methylanilin and dimethylanilin, while heating the mixture sufficiently to maintain the same in a liquid condition.

5. The process of producing dimethyldiphenylurea which comprises passing carbonyl chlorid into a mixture of methylanilin and dimethylanilin, the mixture being sufficiently heated during the reaction to maintain the same in a liquid condition, the temperature near the end of the reaction being between 80 and 100° C., and then separating the resulting dimethyldiphenylurea from dimethylanilin hydrochlorid.

6. The process of producing dimethyldiphenylurea which comprises passing carbonyl chlorid into a mixture of anilin, methylanlin and dimethylanilin in the proportions of about 10%, 40% and 50% respectively, the mixture being sufficiently heated during the reaction to maintain the same in a liquid condition, the temperature near the end of the reaction being between 80 and 100° C. and then separating the resulting dimethyldiphenylurea from dimethylanilin hydrochlorid.

In testimony that I claim the foregoing I have hereunto set my hand.

HERBERT WINKEL.

Witnesses:
ARTHUR P. TAUBERG,
R. L. ANDREAU.